United States Patent
Zhao et al.

(10) Patent No.: US 10,920,360 B2
(45) Date of Patent: Feb. 16, 2021

(54) SUPPORT FOR WASHING MACHINE WITH AUTOMATIC LEVELING FUNCTION AND WASHING MACHINE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Sheng Xu, Shandong (CN); Huacheng Song, Shandong (CN); Wenbing Xu, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 14 days.

(21) Appl. No.: 16/325,069

(22) PCT Filed: Jun. 29, 2017

(86) PCT No.: PCT/CN2017/090836
§ 371 (c)(1),
(2) Date: Feb. 12, 2019

(87) PCT Pub. No.: WO2018/032885
PCT Pub. Date: Feb. 22, 2018

(65) Prior Publication Data
US 2020/0173095 A1    Jun. 4, 2020

(30) Foreign Application Priority Data
Aug. 16, 2016 (CN) .......................... 201610676233.2

(51) Int. Cl.
*F16F 13/08* (2006.01)
*D06F 39/12* (2006.01)
*F16F 15/02* (2006.01)

(52) U.S. Cl.
CPC ............ *D06F 39/125* (2013.01); *F16F 13/08* (2013.01); *F16F 15/022* (2013.01); *F16F 2224/025* (2013.01); *F16M 2200/08* (2013.01)

(58) Field of Classification Search
USPC ................. 248/677, 188.2, 188.5, 188.8
See application file for complete search history.

(56) References Cited

U.S. PATENT DOCUMENTS 3,667,707 A    6/1972  Mui
3,768,766 A *  10/1973 Bain ..................... A47B 91/16
                                                      248/188.2

(Continued)

FOREIGN PATENT DOCUMENTS

CH        695348 A5    4/2006
CN      105755750 A    7/2016

(Continued)

OTHER PUBLICATIONS

International Search Report (PCT/ISA/210) dated Sep. 26, 2017, by the State Intellectual Property Office of the P.R. China as the International Searching Authority for International Application No. PCT/CN2017/090836.

(Continued)

*Primary Examiner* — Alfred J Wujciak
(74) *Attorney, Agent, or Firm* — Buchnan Ingersoll & Rooney PC

(57) ABSTRACT

A support for washing machine with automatic leveling function comprises a sheath; a regulating mechanism arranged inside the sheath in an axial movable manner, whose circumferential rotation is limited by the sheath; and (Continued)

a flexible body inside the regulating mechanism for accommodating a hydraulic medium. The flexible body comprises a telescopic end which acts on the regulating mechanism, the telescopic end expands and contracts under an action of the hydraulic medium and drives the regulating mechanism to move axially for automatic leveling. Based on the hydraulic principle, the support can perform adaptive regulation automatically by means of the fluidity of the hydraulic medium of different pressures. Moreover, the structures of the regulating mechanism and the sheath are designed to avoid that the automatic leveling for washing machine is influenced by the regulating mechanism's rotation in inside the sheath. Thus, the automatic leveling effect is ensured.

13 Claims, 6 Drawing Sheets

(56) References Cited

U.S. PATENT DOCUMENTS

| | | | |
|---|---|---|---|
| 4,317,472 A | 3/1982 | Zahid | |
| 4,625,424 A | 12/1986 | De La Haye | |
| 9,909,709 B2* | 3/2018 | Pike | A47B 91/10 |
| 2006/0180720 A1 | 8/2006 | Coumoyer et al. | |
| 2016/0025261 A1 | 1/2016 | Pike et al. | |
| 2017/0258228 A1 | 9/2017 | Kato | |
| 2018/0187362 A1 | 7/2018 | Zhao et al. | |
| 2018/0195227 A1 | 7/2018 | Zhao et al. | |
| 2018/0202095 A1 | 7/2018 | Zhao et al. | |

FOREIGN PATENT DOCUMENTS

| | | |
|---|---|---|
| CN | 105755757 A | 7/2016 |
| CN | 105757408 A | 7/2016 |
| CN | 205775399 U | 12/2016 |
| DE | 10156397 A1 | 5/2003 |
| WO | 2016/088529 A1 | 6/2016 |

OTHER PUBLICATIONS

International Search Report (PCT/ISA/210) dated Sep. 21, 2017, by the State Intellectual Property Office of the P.R. China as the International Searching Authority for International Application No. PCT/CN2017/090838.

Office Action issued by the U.S. Patent and Trademark Office in the U.S. Appl. No. 16/325,227, dated Aug. 7, 2020, U.S. Patent and Trademark Office, Alexandria, VA. (19 pages).

Extended European Search Report dated Aug. 13, 2019, issued by the European Patent Office in corresponding European Application No. 17840862.1. (7 pages).

* cited by examiner

SUPPORT FOR WASHING MACHINE WITH AUTOMATIC LEVELING FUNCTION AND WASHING MACHINE

TECHNICAL FIELD

The present disclosure relates to a technical field for washing machine, and specifically, relates to a support for washing machine with automatic leveling function, and a washing machine.

BACKGROUND

Generally, leveling devices are arranged at bottoms of shells of the household appliances, the household appliances can achieve a stable placed state through regulating the leveling devices when the household appliances are placed, and the leveling devices can support the household appliances and keep the household appliances stable after the household appliances are placed in a leveled manner.

Taking a washing machine for example, bolt supports are generally mounted at the bottom of a shell or whole set of the existing washing machine, each bolt support comprises a lead screw, a nut gasket and a rubber pad. The nut gaskets can be screwed up and down on the lead screws, the lead screws can also be screwed up and down in screw holes of a bottom plate of the shell, and the height regulating for washing machine is achieved through lengths of the lead screws of the bolt supports screwed in the screw holes of the bottom plate. For a majority for washing machines, heights are increased through counterclockwise rotation of the supports, the heights are reduced through clockwise rotation of the supports; and after the heights of the bolt supports are regulated, the nut gaskets for preventing loosening are screwed down to keep steadiness.

For the supports for washing machine, although the leveling for washing machine is achieved, users are required to carry out manual regulation, and user operation is extremely inconvenient if the dead weight for washing machine is relatively heavy or a setting space is narrow and small. In addition, during the long-term working for washing machine, vibration also acts on the leveling supports, the supporting failure of the leveling supports is easily caused, and thus, the out-of-flat placement for washing machine is caused.

For example, the existing 8 KG drum washing machine is generally about 80 Kg and is relatively heavy, the regulation by customers is extremely inconvenient, the condition that the washing machine is regulated to an optimum state cannot be guaranteed even if the regulation is completed. During the washing, particularly spin-drying dewatering of acceleration to 1400 r/min from 0r/min for washing machine, great vibration will be caused once the washing machine is not horizontal or suffers from a support failure problem, and thus, the comfort of use of the customers is greatly affected.

In addition, the vibration caused by the out-of-flat for washing machine may loosen screws of the supports, supporting brackets of the supports may vertically move, a horizontal state for washing machine may be changed by the instability, and vibration that is more intensive is caused. Due to the vicious cycle, the noise for washing machine will become louder and louder in long-time use, certain damage to the washing machine is caused, and the service life for washing machine is shortened.

Therefore, the leveling of the existing washing machines has the problems of manual regulation, time and labor consuming and relatively poor accuracy.

Taking this into consideration, the present disclosure is provided.

SUMMARY

In order to solve the above problems, a first disclosure object of the present disclosure is to provide a support for washing machine with automatic leveling function. And specifically, a technical scheme as follows is adopted:

A support for washing machine with automatic leveling function comprises a sheath;

a regulating mechanism, which is arranged inside the sheath in an axial movable manner, and of which the circumferential rotation is limited by the sheath; and a flexible body assembly, which is arranged inside the regulating mechanism for accommodating a hydraulic medium.

The flexible body assembly comprises a telescopic end which acts on the regulating mechanism, the telescopic end expands and contracts under an action of the hydraulic medium and drives the regulating mechanism to move axially for automatic leveling.

Further, the outer contour of the regulating mechanism is provided with at least one regulating mechanism limiting surface;

the inner wall of the sheath is provided with one sheath limiting surface;

the regulating mechanism limiting surface and the sheath limiting surface are matched with each other to limit the circumferential rotation of the regulating mechanism in the sheath.

Further, the regulating mechanism is of a columnar structure which is internally provided with a hollow chamber, the outer surface of the side wall of the columnar structure comprises a plurality of limiting surfaces;

the sheath is of a columnar structure which is internally provided with a hollow chamber, the inner wall of the hollow chamber of the columnar structure comprises a plurality of limiting surfaces corresponding to the regulating mechanism;

the telescopic end of the flexible body assembly is arranged inside the hollow chamber of the regulating mechanism, the regulating mechanism is arranged inside the hollow chamber of the sheath.

Further, the regulating mechanism and the sheath are both of a prismatic structure which is internally provided with the hollow chamber.

Further, the hollow chamber of the sheath penetrates up and down, an inwardly extending stopping part is arranged at an opening of the lower end of the hollow chamber;

the outer surface of the side wall of the regulating mechanism is provided with a limiting table, one end of the regulating mechanism penetrates into the hollow chamber from an opening of the upper end, and penetrates out of the hollow chamber from the opening of the lower end;

the limiting table abuts against the stopping part for preventing the regulating mechanism from falling off from the hollow chamber of the sheath.

Further, the regulating mechanism comprises a larger end and a smaller end which are integrally formed, the lateral length of the larger end is larger than that of the smaller end, the larger end intersects with the smaller end to form the limiting table;

the outer surface of the side wall of the larger end is matched with the inner wall of the hollow chamber of the sheath, the outer surface of the inner wall of the smaller end is matched with the limiting opening formed in the stopping part.

Further, one end of the flexible body assembly is limited and mounted inside the sheath, another end is the telescopic end which acts on the regulating mechanism;

the end of the flexible body assembly which is arranged inside the sheath has a limiting surface matched with the regulating mechanism.

Further, the flexible body assembly comprises an hydraulic plate, a pressing plate and an oil bag, an opening of the oil bag is hermetically connected to the lower wall of the hydraulic plate through the pressing plate;

one side of the hydraulic plate is provided with a oil nozzle, the lower wall of the hydraulic plate is provided with an oil hole for letting the hydraulic medium inside the oil bag flow in, the hydraulic plate is provided with an oil passage which communicates the oil nozzle and the oil hole;

the hydraulic plate has the limiting surface which is matched with the regulating mechanism; preferably, the hydraulic plate is of the same prismatic structure as the regulating mechanism.

Further, a limiting plate is further provided, the limiting plate comprises a protrudingly arranged limiting claw, the sheath is provided with a limiting groove which is matched with the limiting claw for limiting;

the limiting plate, the hydraulic plate and the pressing plate are fixedly connected, to limit the circumferential rotation of the flexible body assembly in the regulating mechanism;

the limiting plate is circular plate-like structure, the sheath further comprises a cylindrical section for accommodating the limiting plate.

A second disclosure object of the present disclosure is to provide a washing machine, specifically, a technical scheme as follows is adopted:

A washing machine with the support for washing machine with automatic leveling function comprises a housing, a plurality of supports for washing machine is mounted at the bottom of the housing, the hydraulic medium provided inside the supports for washing machine circulates inside the supports for washing machine and/or between the supports for washing machine and levels these supports.

According to the support for washing machine with automatic leveling function, provided by the present disclosure, based on the hydraulic principle, the support is provided with the hydraulic medium, the support can perform adaptive regulation automatically by means of the fluidity of the hydraulic medium of different pressures.

According to the support for washing machine with automatic leveling function of the embodiment, the structures of the regulating mechanism and the sheath are designed to realize that the regulating mechanism is limited and mounted inside the sheath, and to avoid that the automatic leveling for washing machine is influenced by the regulating mechanism's rotation in inside the sheath. Then, the automatic leveling effect is ensured.

Therefore, the support for washing machine of the present disclosure has a simple structure, and is low in cost and is easy to use with high reliability, and greatly reduces vibration and noised. Thud, the comfort of the user experience for washing machine is improved.

Figure 1:
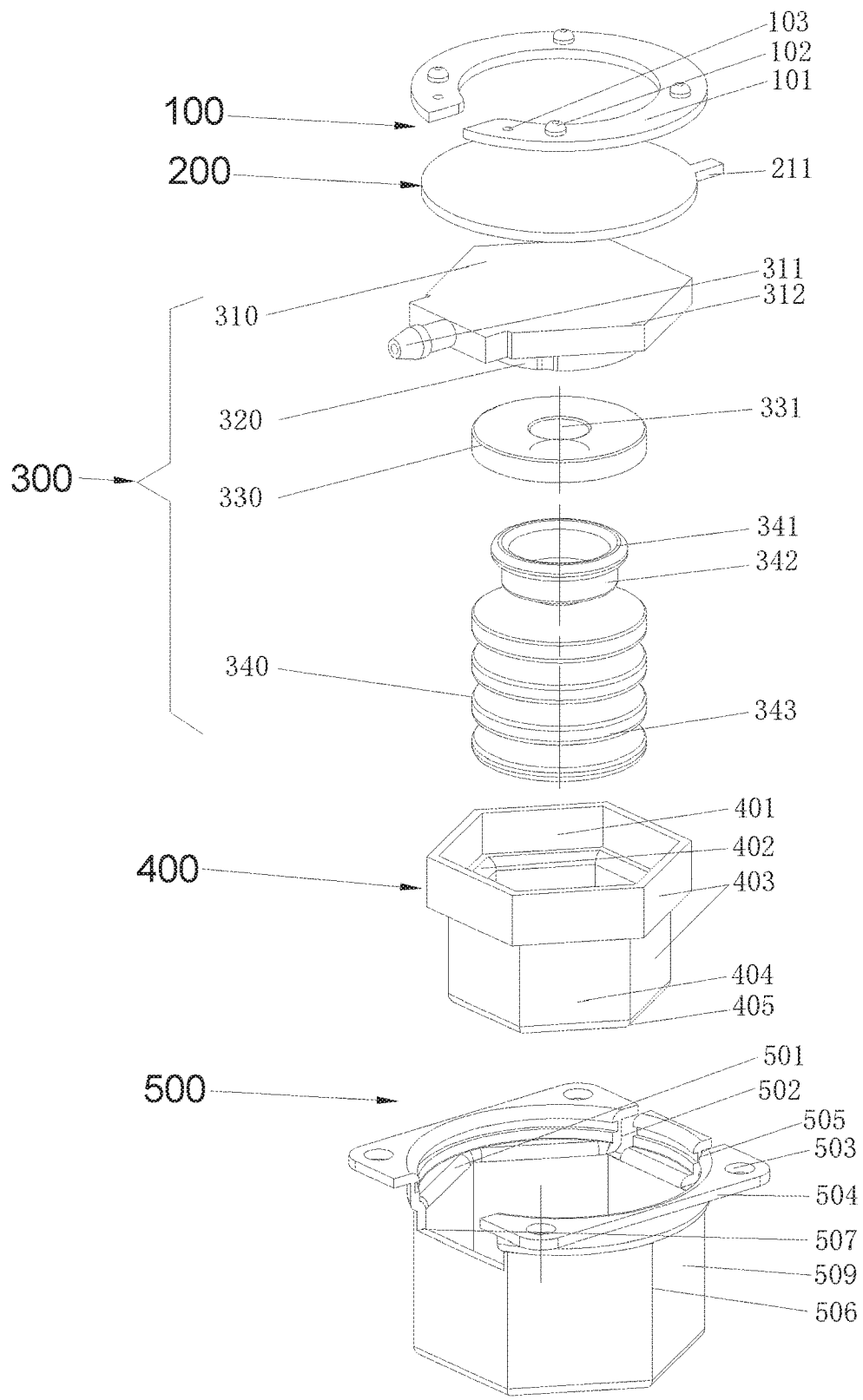
FIG. 1 is an exploded view I of a support for washing machine with automatic leveling function of the embodiment of the present disclosure.
Figure 2:
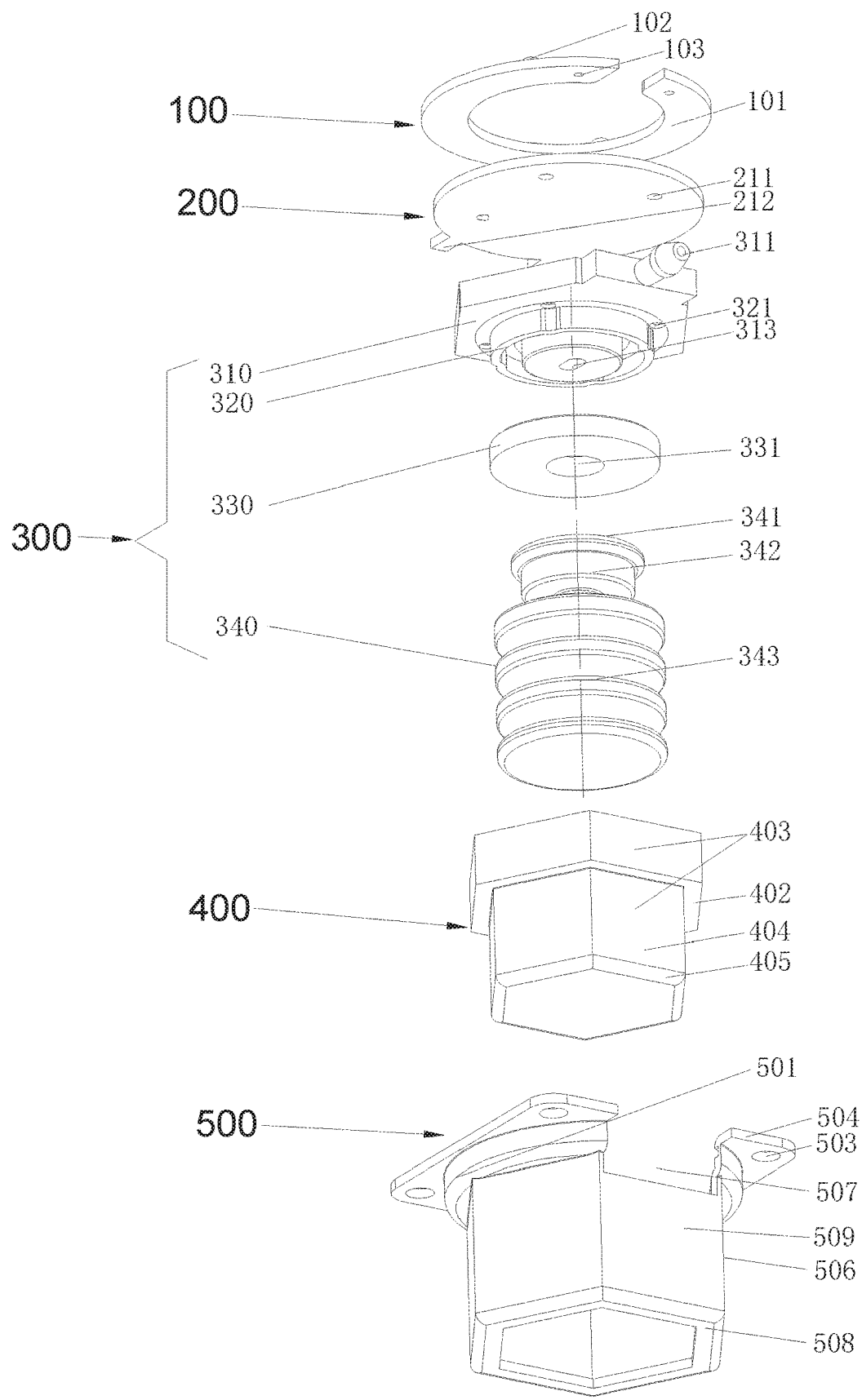
FIG. 2 is an exploded view II of the support for washing machine with automatic leveling function of the embodiment of the present disclosure.
Figure 3:
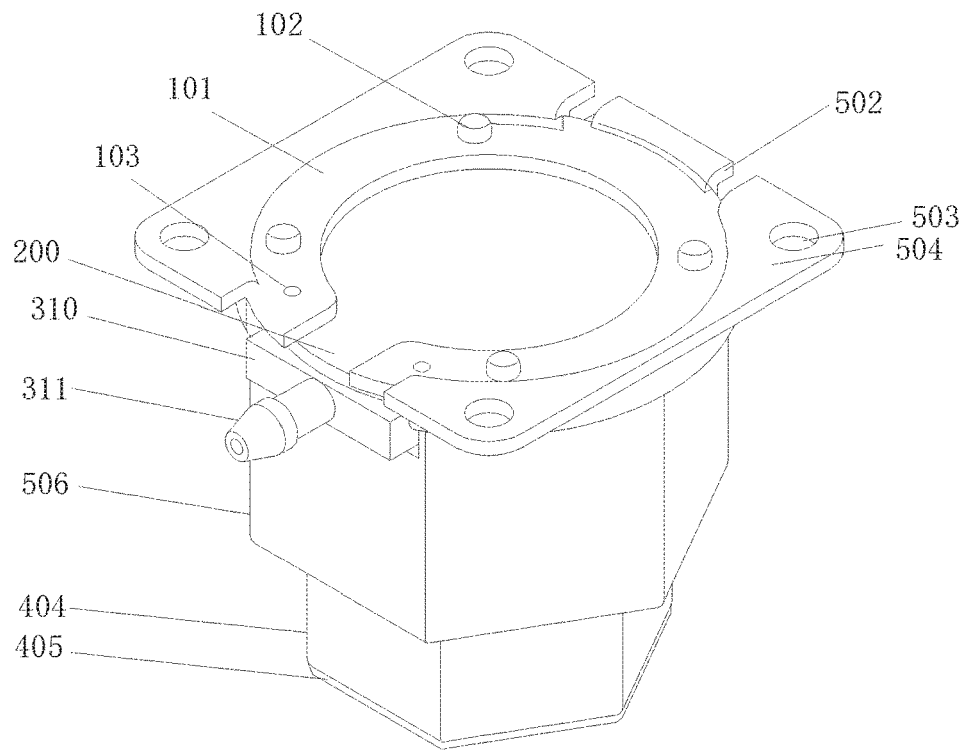
FIG. 3 is a three-dimensional structure schematic diagram of the support for washing machine with automatic leveling function of the embodiment of the present disclosure.
Figure 4:
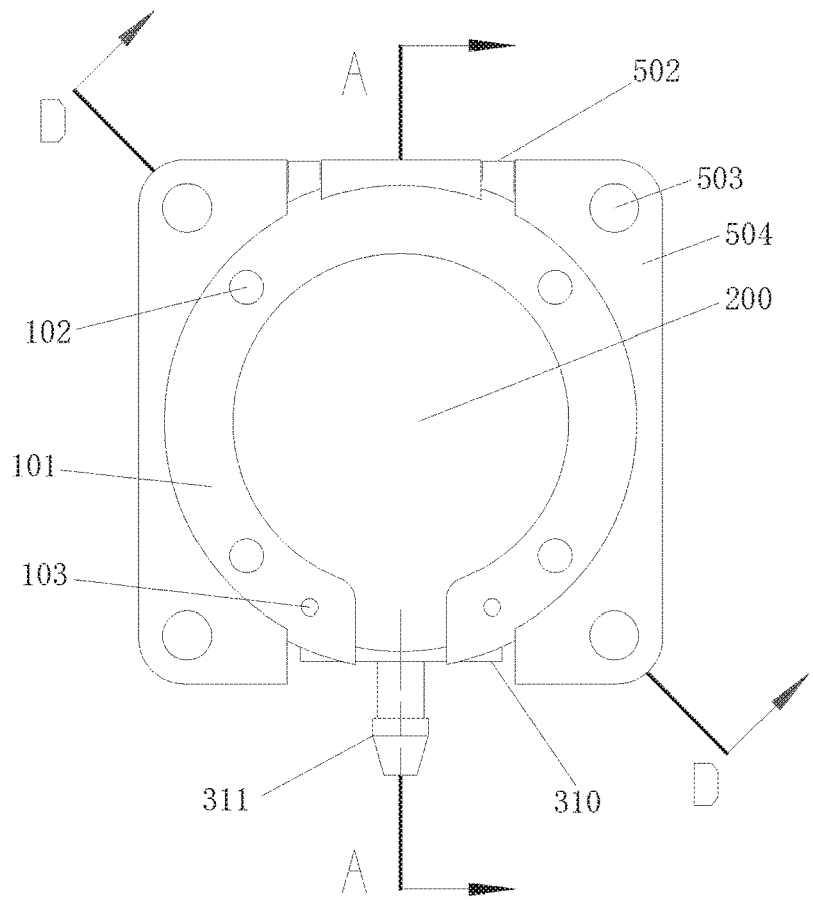
FIG. 4 is a top view of the support for washing machine with automatic leveling function of the embodiment of the present disclosure.
Figure 5:
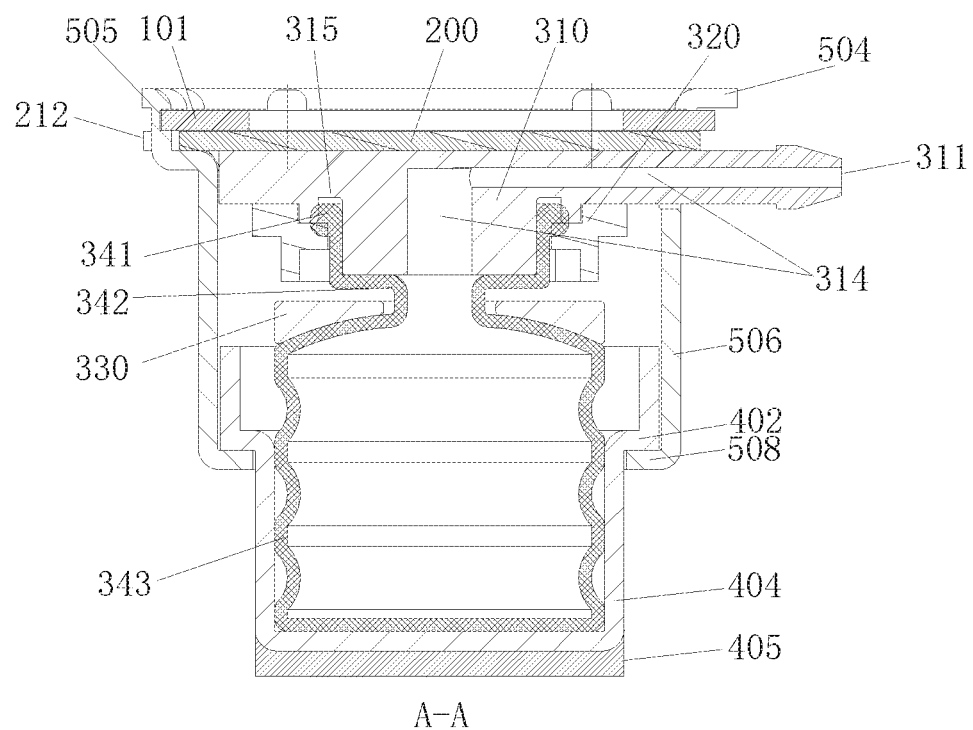
FIG. 5 is a sectional view of the support for washing machine with automatic leveling function of the embodiment of the present disclosure along a plane A-A in the FIG. 4.
Figure 6:
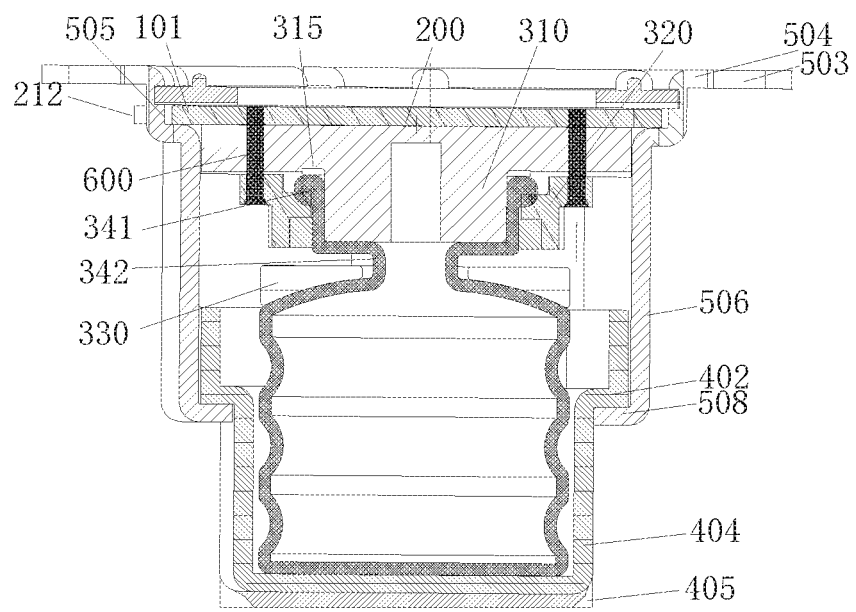
FIG. 6 is a sectional view of the support for washing machine with automatic leveling function of the embodiment of the present disclosure along a plane D-D in the FIG. 4.

Reference Sign: 100—axial limiting device, 101—clamp spring, 102—limiting protrusion, 103—hole, 200—limiting plate, 211—limiting claw, 212—limiting plate mounting hole, 300—flexible body assembly, 310—hydraulic plate, 311—oil nozzle, 313—oil hole, 314—oil passage, 320—pressing plate, 321—pressing plate mounting hole, 330—upper protection ring, 331—mounting hole, 340—oil bag, 341—opening, 342—throttling fine diameter part, 343—corrugation structure, 400—regulating mechanism, 401—hollow chamber, 402—limiting table, 403—regulating mechanism limiting surface, 404—columnar body, 405—elastic gasket, 500—sheath, 501—supporting surface, 502—limiting groove, 503—sheath fixing hole, 504—sheath plane, 505—ring-shaped groove, 506—sleeve body, 507—notch, 508—stopping part, 509—sheath limiting surface, 600—bottom plate, 700—sealing device, 800—high pressure oil pipe, 900—communicating device, 1000—support for washing machine, 1100—ground, 1101—ground pit.

DETAILED DESCRIPTION

A support for washing machine with automatic leveling function and washing machine provided by the present disclosure are descried in detail below with reference to the accompanying drawings.

Embodiment 1

Referring to from FIG. 1 to FIG. 6, a support for washing machine automatic leveling function provided by the embodiment, comprises:

a sheath 500;

a regulating mechanism 400, which is arranged in the sheath 500 and is axially movable relative to the sheath 500;

and a flexible body assembly 300, which is arranged in the regulating mechanism 400 for accommodating a hydraulic medium.

One end of the flexible body assembly 300 is limited and mounted in the sheath 500, another is a telescopic end acting on the regulating mechanism 400.

The telescopic end of the flexible body assembly 300 extends and retracts to drive the regulating mechanism 400 to axially move to realize automatic leveling under the action of hydraulic medium.

In the embodiment, at least four supports for washing machine are placed on the four corners of the bottom plate of the washing machine, or are placed along the circumferential direction of the bottom plate, and at least two supports for washing machine are communicated with each other. When the ground in which the washing machine is placed is uneven, it results in different pressure of each support for washing machine, the hydraulic medium of supports for washing machine communicated with each other circulates from the support with greater stress to the support with smaller stress. The flexible body assembly 300 extends and retracts with the circulation of the hydraulic medium to drive the regulating mechanism 400 to axially move for automatic leveling.

In the embodiment, the supports for washing machine are communicated with each other, so that the hydraulic medium inside the supports for washing machine can circulate among the supports for washing machine. When one support for washing machine is compressed by the stress, the hydraulic medium circulates to the other support for washing machine which is communicated with the compressed support, the pressure of the other support for washing machine increases with the increase of the hydraulic medium thereof, so that the other support for washing machine extends to ensure enough supporting force.

In the embodiment, the flexible body assembly 300, of the support for washing machine with automatic leveling function, is limited and mounted inside the sheath 500, to avoid the damage of the flexible body assembly 300. It can ensure the working stability of the flexible body assembly 300.

Moreover, the support for washing machine with automatic leveling function, provided by the embodiment, has high assembly efficiency, the assembly thereof is easy and convenient. And the force-suffering components (such as the sheath 500) can be made of sheet metal, or made of zinc alloy through casting, or made of high-performance engineering plastics such as PPS, PT, PEEK through injection molding, with high reliability.

In the embodiment, the support for washing machine with automatic leveling function is provided with an optimized structure, which is easy to assembly and is conductive to mounting. It avoids damage to the flexible body assembly 300 as much as possible, ensuring the overall stability of the support for washing machine, and prolonging the service life.

Specifically, the sheath 500, provided by the embodiment, comprises a sleeve body 506 with a hollow passage therein. The regulating mechanism 400 is arranged in the hollow passage of the sleeve body 506 in an axial slidable manner, and one end thereof stretches out of the hollow passage of the sleeve body 506 for contacting with the ground, and it can slide axially, according to the height of the ground, under the action of the hydraulic medium for realizing automatic leveling.

In the embodiment, the opening of one end of the sleeve body 506 is flanged to the outer side of the hollow passage and extends to form a sheath plane 504. The sheath plane 504 is fit with the bottom plate of the washing machine and is fixedly connected by a connecting piece. The sleeve body 506, provided by the embodiment is fixedly mounted on the bottom plate of the washing machine through the sheath plane 504, the flexible body assembly 300 is arranged inside the sheath 500. In this way, the sheath 500 interacts with the bottom plate, and the flexible body assembly 300, without bearing the acting force of washing machine, only extends and retracts under the action of the hydraulic medium to ensure the working stability.

In the embodiment, the sleeve body 506 is of a columnar structure, having a certain length to match with the regulating mechanism 400, at least a part of the regulating mechanism 400 is wrapped by the sleeve body 506.

In the embodiment, the upper part of the sleeve body 506 is provided with a stamped and integrally formed flanged structure, forming a sheath plane 504. The sheath plane 504 is provided with a sheath fixing hole 503, so that the sheath 500 and the whole support for washing machine are further fastened to the bottom plate of the washing machine through screws and bolts.

Preferably, the sheath 500, provided by the embodiment, can be made of plastics through integral injection molding or made of aluminum alloy through die-casting, and preferably made of sheet metal by stamping.

In the embodiment, the flexible body assembly 300 comprises a hydraulic plate 310, a pressing plate 320 and an oil bag 340. The opening of the oil bag 340 is hermetically connected to the lower wall of the hydraulic plate 310 through the pressing plate 320.

In the embodiment, one side of the hydraulic plate 310 is provided with an oil nozzle 311. The lower wall of the hydraulic plate 310 is provided with an oil hole 313 for letting the hydraulic medium of the oil bag 340 flow in. An oil passage 314 communicated with the oil nozzle 311 and the oil hole 313 is provided inside the hydraulic plate 310.

In the embodiment, the hydraulic plate 310 is limited and mounted on one end of the sheath plane 504 of the sleeve body 506. The oil bag 340 is arranged inside the sheath 500 and is in contact with the inner wall of the sheath 500.

In the embodiment, the hydraulic plate 310 is made by integral injection molding or made by die-casting, the hydraulic plate 310 has at least two oil nozzles 311 for the mutual communication of supports for washing machine, so that the hydraulic medium is circulated among the supports for washing machine.

In the embodiment, the oil hole 313 is arranged in the middle of the hydraulic plate 310, the oil passage 314 is arranged inside the hydraulic plate 310 to make sure that the hydraulic medium inside the oil bag 340 can circulate to the oil nozzle 311 from the oil hole 313 through the oil passage 314. It further realizes the free circulation of the hydraulic medium among multiple supports for washing machine according to the pressure level, and realizes automatic leveling.

In the embodiment, the hydraulic medium is provided inside the oil bag 340. The hydraulic plate 310 is used for the sealing of the hydraulic medium inside the oil bag 340 and is used to let the hydraulic medium inside the oil bag 340 flow out/in through the oil nozzle 311 of the hydraulic plate 220. The pressing plate 320 is used to ensure the hermetically connection between the opening of the oil bag 340 and the hydraulic plate 310, avoiding the leakage of the hydraulic medium.

In the embodiment, the oil bag 340 of the flexible body assembly 300 is a telescopic structure which is made of the flexible material, preferably, the flexible material is with elasticity and can achieve deformation recovery. The hydraulic plate 310 is made by integral injection molding or made by die-casting forming. Therefore, it is only required that the hydraulic plate 310 is limited and mounted inside the sleeve body 506, so that the limiting mounting of the flexible body assembly 300 can be achieved.

In order to realize the limiting mounting of the flexible body assembly 300 provided by the embodiment, it is mainly required to limit the circumferential rotational movement and axial up and down endplay of the flexible body assembly 300. In order to limit the circumferential rotational movement of the flexible body assembly 300, specifically:

In the embodiment, the support for washing machine further comprises a limiting plate 200. The limiting plate 200 comprises at least one protrudingly disposed limiting claw 211. The sleeve body 506 is provided with a limiting groove 502 which matches with the sleeve body 506 for limiting. The limiting plate 200, the hydraulic plate 310 and the pressing plate 320 are fixedly connected to limit the circumferential rotation of the flexible body assembly 300 in the regulating mechanism 400.

In the embodiment, the flexible body assembly 300 is unable to circumferentially rotate by the means that the limiting claw 211 of the limiting plate 200 is matched with the limiting groove 502 of the sleeve body 506.

In the embodiment, a plurality of limiting claws 211 of the limiting plate 200 are provided and arranged according to the specific structure and the mounting of the hydraulic plate 310.

Specifically, the sleeve body 506 is provided with a notch 507 for letting the oil nozzle 311 of the hydraulic plate 310 stretch out. Therefore, the position of the opening should be considered when the limiting claw 211 is arranged. The limiting claw 211 should yield the opening to ensure the limiting mounting.

In the embodiment, the limiting plate 200 is provided with a limiting plate mounting hole 212, the hydraulic plate 310 is provided with a hydraulic plate mounting hole, the pressing plate 320 is provided with a pressing plate mounting hole 321. The pressing plate 320, the hydraulic plate 310 and the limiting plate 200 are fastened together through screws or bolts.

In the embodiment, the sheath 500 is arranged on the bottom plate of the washing machine. The hydraulic plate 310 is fastened to the limiting plate 200. The upper part and lower part of the limiting plate 200 are limited, the lower part of the limiting plate 200 is the lowest end of the limiting groove 502, and the limiting plate 200 has force supporting points along the circumferential direction due to the arrangement of limiting claw 211 and the limiting groove 502, namely, the limiting claw 211 and the limiting groove 502 are distributed as evenly as possible along the circumferential direction.

Preferably, the limiting plate 200 is made of sheet metal by stamping, which is easy and low in cost.

In order to limit the axial movement of the flexible body assembly 300, specifically:

In the embodiment, the support for washing machine further comprises an axial limiting device 100 which is arranged inside the sheath 500. One side of the axial limiting device 100 is limited to the bottom plate of the washing machine, another side thereof acts on the flexible body assembly 300 for limiting its axial movement.

In the embodiment, the axial movement of the flexible body assembly 300 is limited by the axial limiting device, further ensuring the working stability of the flexible body assembly 300.

As a preferred implementation mode of the embodiment, the axial limiting device is a clamp spring 101 with a notch. A ring-shaped groove 505 is arranged in the inner wall of the sheath 500. The clamp spring 101 is stuck in the ring-shaped groove 505 and is located above the limiting plate 200. It is easy and convenient in mounting and removal, and is low in cost by adopting the clamp spring 101. The ring-shaped groove 505 arranged in the inner wall of the sheath 500 can efficiently limit the clamp spring 101 to ensure the mounting stability of the clamp spring 101.

In the embodiment, the ring-shaped groove 505 is arranged in the inner circumference of the sheath 500. The ring-shaped groove 505 can be made by stamping, preferably, made by machining. The upper clamp spring 101 is mounted after the limiting plate 200 is mounted to the sheath 500. The limiting plate 200 cannot move up and down after the clamp spring 101 is mounted.

Further, a limiting protrusion 102 is arranged on the upper surface of the clamp spring 101, and the limiting protrusion 102 further plays an axial limiting role when the clamp spring 100 is subject to axially endplay. The limiting protrusion 102 arranged in the clamp spring 101 is conductive to uniform stress.

Further, a hole 103 for tool operation is arranged in the clamp spring 100. The hole 103 arranged in the clamp spring 100 is conductive to tool mounting.

In the embodiment, the oil bag 340 comprises a telescopic corrugation structure 343, a throttling fine diameter part 342 and an opening 341. The throttling fine diameter part 342 is communicated with the corrugation structure 343, the opening 341 is located at the end part of the throttling fine diameter part 342.

The flexible body assembly 300 further comprises an upper protection ring 330. The center of the upper protection ring 330 is provided with a mounting hole 331 for letting the throttling fine diameter part 342 pass through, the throttling fine diameter part 342 enters in the mounting hole 331.

A fitting surface which is matched with the oil bag 340 is arranged on the lower surface of the upper protection ring 330 to avoid the oil bag 340 being damaged from being pressed upward under high pressure.

The mounting hole 331 can ensure the strength at the throttling fine diameter part 342, to avoid the damage and deformation. It ensures that the throttling fine diameter part 342 of the oil bag 340 is always opened, and further ensures the working validity of the support for washing machine.

The portion of the upper protection ring 330 in contact with the oil bag 340 conforms to the shape of the oil bag.

A relatively sealed space is formed by the upper protection ring 330 and the hollow chamber structure of the regulating mechanism 400. The oil bag arranged in the sealed space is protected by the upper protection ring 330 and the regulating mechanism 400, to effectively prevent the oil bag from expanding and breaking or being damaged.

The oil bag 340 is provided with the opening 341, the throttling fine diameter part 342 and the corrugation structure 343, the hydraulic medium is provided inside the oil bag 340. Preferably, the hydraulic medium is hydraulic oil.

The oil bag 340 is made of an oil-resistant elastomer material, such as nitrile rubber, acrylate rubber, silica gel and others.

Since the oil bag 340 is in a working state of up and down compression and stretching, the main body of the oil bag 340 is designed as the corrugation structure 343 in order to improve its reliability and prolong the service life.

The oil bag 340 is fit with the regulating mechanism 400 and the upper protection ring 330, and there is only a certain gap at the corrugation structure 343.

In support for washing machine of the embodiment, the flexible body assembly 300 is limited and mounted mainly to avoid the instability caused by the rotation of the support for washing machine during the automatic leveling.

In the embodiment, the outer side of the bottom wall of the regulating mechanism 400 is provided with an elastic gasket 405. The bottom wall of the regulating mechanism 400 is provided with a reinforcing fitting groove. The upper surface of the elastic gasket 405 is provided with a reinforcing fitting rib matched with the reinforcing fitting groove, the lower surface of the elastic gasket 405 is partially recessed to form a damping rib.

Preferably, the elastic gasket 405 is a rubber gasket. In order to enhance the connection strength of the regulating mechanism 400 and the rubber gasket, the reinforcing fitting groove is arranged on the bottom of the regulating mechanism 400, the reinforcing fitting rib is arranged in the rubber gasket. Preferably, the rubber is integrally molded on the regulating mechanism 400. The portion of the rubber gasket which is in contact with the ground is preferably provided with some recessed patterns to form the damping rib. It increases the fictional damping between the support and the ground, and avoids the washing machine from shifting due to the vibration.

Embodiment 2

Referring to from FIG. 1 to FIG. 6, a support for washing machine with automatic leveling function, provided by the embodiment, comprises:

a sheath 500;

a regulating mechanism 400, which is arranged in the sheath 500 in an axial movable manner, circumferentially rotate of the regulating 400 is limited by the sheath 500;

and a flexible body assembly 300, which is arranged in the regulating mechanism 400 for accommodating a hydraulic medium.

The flexible body assembly 300 comprises a telescopic end acting on the regulating mechanism 400. The telescopic end extends and retracts to drive the regulating mechanism 400 to axially move to realize automatic leveling under the action of hydraulic medium.

The movement of the regulating mechanism 400 is limited by the support for washing machine, so that the regulating mechanism only moves up and down without rotation. The stability during the leveling process is ensured.

In order to limit the circumferential rotational movement of the flexible body assembly 300, as a preferred implementation mode of the embodiment: the outer contour of the regulating mechanism 400 is provided with at least one regulating mechanism limiting surface 403 and the inner wall of the sheath 500 is provided with at least one sheath limiting surface 509. The regulating mechanism limiting surface 403 and the sheath limiting surface 509 are matched with each other to limit the circumferential rotation of the regulating mechanism 400 in the sheath 500.

In the embodiment, the regulating mechanism 400 and the sheath 500 are respectively provided with the limiting surfaces, so that the limiting surfaces need to be taken into consideration when the regulating mechanism 400 is mounted into the sheath 500. Therefore, the mounting manner thereof and the state fixation after the mounting are limited. The regulating mechanism will not circumferentially rotate during the movement, ensuring the working stability of the support for washing machine.

Further, the regulating mechanism 400, provided by the embodiment, is of a columnar structure which is internally provided with a hollow chamber. The outer surface of the sidewall of the columnar structure comprises a plurality of limiting surfaces. The sheath 500 is of a columnar structure which is internally provided with the hollow chamber. The inner wall of the hollow chamber of the columnar structure comprises a plurality of limiting surfaces corresponding to the regulating mechanism 400. The telescopic end of the flexible body assembly 300 is arranged inside the hollow chamber of the regulating mechanism 400. The regulating mechanism 400 is arranged inside the hollow chamber of the sheath 500.

In the embodiment, the regulating mechanism 400 and the sheath 500 respectively comprise a plurality of limiting surfaces. One limiting surface intersects with the other limiting surface to form a limiting angle. The limiting angle of the regulating mechanism 400 is matched with the limiting angle of the sheath 500 after the regulating mechanism 400 is mounted inside the sheath 500, to limit the circumferential rotation of the regulating mechanism 400.

Specifically, the regulating mechanism 400 and the sheath 500, provided by the embodiment, are both prismatic structure which is internally provided with the hollow chamber. In this embodiment, the regulating mechanism 400 and the sheath 500 are both processed into the polygonal prismatic structure. The circumferential rotation of regulating mechanism 400 can be limited through the matching of the polygonal prismatic structure, and no additional limiting device is required to be arranged. It is simple and convenient, and is with good limiting effect.

Further, the hollow chamber inside the sheath 500, provided by the embodiment, is penetrates up and down, and an inwardly extending stopping part 508 is arranged at the opening of the lower end. A limiting table 402 is arranged on the outer surface of the side wall of the regulating mechanism 400. One end of the regulating mechanism 400 penetrates into the hollow chamber from the opening of the upper end, and penetrates out of the hollow chamber from the opening of the lower end. The limiting table 402 abuts against the stopping part 508 for preventing the regulating mechanism 400 from falling off from the hollow chamber of the sheath 500.

As a preferred implementation mode of the embodiment, the regulating mechanism 400 comprises a larger end and a smaller end which are integrally formed. The lateral length of the larger end is larger than that of the smaller end. The larger end intersects with the smaller end to form a limiting table 402. The outer surface of the side wall of the larger end is matched with the inner wall of the inner wall of the hollow chamber of the sheath 500. The outer surface of the inner wall of the smaller end is matched with a limiting opening provided by the stopping part 508.

Since the sheath 500, provided by the embodiment, adopts the irregular structure or the prismatic structure with limiting surfaces, instead of adopting the cylindrical structure, the structure characteristics of the sheath 500 are taken into consideration when the flexible body assembly 300 is mounted. Therefore, one end of the flexible body assembly 300, provided by the embodiment, is limited and mounted inside the sheath 500, another end is the telescopic end acting on the regulating mechanism 400. One end of the flexible body assembly 300, which is mounted inside the sheath 500, has the limiting surface matched with the regulating mechanism 400.

Specifically, the flexible body assembly 300, provided by the embodiment, comprises a hydraulic plate 310, a pressing plate 320 and an oil bag 340. The opening of the oil bag 340 is hermetically connected to the lower wall of the hydraulic plate 310 through the pressing plate 320. An oil nozzle 311 is arranged at one side of the hydraulic plate 310. An oil hole 313 for letting the hydraulic medium in the oil bag 340 flow in is arranged in the lower wall of the hydraulic plate 310. An oil passage 314 which communicates the oil nozzle 311 and the oil hole 313 is arranged inside the hydraulic plate 310. The hydraulic plate 310 is provided with the limiting surface which is matched with the regulating mechanism 400. Preferably, the hydraulic plate 310 is of a prismatic structure which is the same as that of the regulating mechanism 400.

In the embodiment, the mounting of a limiting plate 200 and a clamp spring 101 are taken into consideration at the same time. Specifically, the limiting surface 200 is of a circular plate-like structure. The sheath 500 further comprises a cylindrical section for accommodating the limiting plate 200 and the clamp spring 101.

In the embodiment, a supporting surface 501 is formed between the cylindrical section and the prismatic structure section of the sheath 500.

According to the support for washing machine with automatic leveling function of the embodiment, the structures of the regulating mechanism 400 and the sheath 500 are designed to realize that the regulating mechanism 400 is limited and mounted inside the sheath 500, and to avoid that the automatic leveling for washing machine is influenced by the regulating mechanism's rotation in inside the sheath 500. The effect of automatic leveling is ensured.

Embodiment 3

The embodiment relates to an assembly method of the support for washing machine.

Based on the sheath 500,

1) Putting the regulating mechanism 400 with the rubber gasket into the sheath 500 from the opening of the upper end thereof.

Note that the limiting surface of the regulating mechanism 400 is matched with the limiting surface of the sheath 500.

2) Mounting the throttling fine diameter part 342 of the oil bag 340 through the upper protection ring 330. Inserting the opening of the oil bag 340 in the sealing groove 315 at the bulge part of the hydraulic plate 310. Pressing the opening of the oil bag 340 by the pressing plate 320. Passing through the limiting plate mounting hole 212, the hydraulic plate mounting hole and the pressing plate mounting hole 321 with the screws or bolts to fix the flexible body assembly 300 which is composed of the oil bag 340, the upper protection ring 330, the pressing plate 320 and the hydraulic plate 310 to the limiting plate 200. Putting the flexible body assembly 300 into the hollow chamber 401 of the regulating mechanism 400.

3) Mounting the limiting plate 200 inside the sheath 500. The lower part of the limiting plate 200 is limited by the stopping part 508, and the circumference thereof is limited by the limiting surface, the limiting claw 211 and the limiting groove 502.

4) Placing the clamp spring 101 is in the ring-shaped groove 505 of the sheath 500. The flexible body assembly 300 no longer moves in the up and down, and circumferential directions relative to the sheath 500. The flexible body assembly 300 and the sheath 500 are fixed together.

The assembly is completed with high assembly efficiency, which is simple and convenient, and the stress components are made of sheet metal, with high reliability.

Embodiment 4

A washing machine which has an above-mentioned support for washing machine with automatic leveling function is provided at the same time by the embodiment. The washing machine comprises a housing, a plurality of the supports 1000 for washing machine are arranged at the bottom of the housing. The hydraulic medium is provided inside the support 1000 for washing machine to circulate between the supports for washing machine for leveling.

The factory setting for washing machine, provided by the embodiment, is preferably that heights of four supports for washing machine are the same. The washing machine is randomly placed on an uneven ground and the four supports for washing machine bears different pressures according to the uneven conditions of the ground and lengths of which regulating mechanism are pressed into sheaths are different. Then the automatic leveling for washing machine is achieved.

Further illustrations which are necessary for the above embodiments are:

1. Every two of the supports of the embodiments of the present disclosure are communicated. It can be three or more and the number N preferably two. It costs the lowest and can achieve better results.

In the embodiment of the present disclosure, the four end openings of the communicating device are applied to be respectively connected with four supports. It is reasonable that three, five, six or N end openings of the communicating device are applied, and the end openings are respectively connected with three, five, six or N supports. The above-described embodiments apply four leveling supports which is the most suitable merely in the situation of being capable of achieving the described functions, to control the cost to the minimum.

2. The embodiments of the present disclosure take a drum washing machine as an example to describe the principle and the method of the automatic leveling of the drum washing machine. What is easy to associate with is that the present disclosure can be applied to a pulsator washing machine.

3. The embodiments of the present disclosure take a washing machine as an example to describe the principle and the method of the automatic leveling for washing machine. What is easy to associate with is that the present disclosure can be applied to refrigerators, freezers, dishwashers and other household appliances.

In the embodiment, there are plenty of implementation modes that the hydraulic oil is injected into the supports for washing machine. The following merely illustrate some implementation modes as an example.

Figure 7:
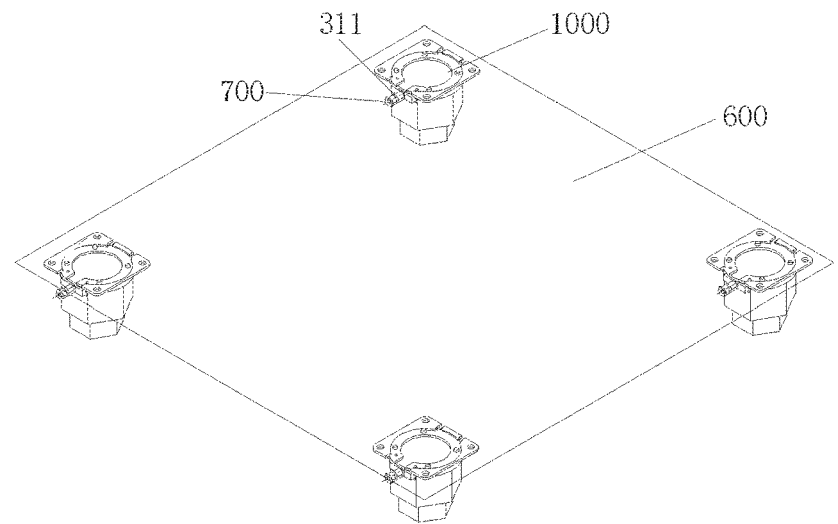
FIG. 7 is a mounting implementation mode I of the support for washing machine with automatic leveling function of the embodiment of the present disclosure.

As shown in FIG. 7 and in the embodiment, an oil nozzle 311 is sealed by a sealing device 700 after injecting a certain amount of the hydraulic oil into each support for washing machine. Each support for washing machine is individually mounted on a bottom plate 600 for washing machine. When the support for washing machine provided by the embodiment is under stress, the internal hydraulic oil is automatically compressed by the stress, the pressure intensity is increased, and the supporting force of the regulating mechanism is increased. The automatic leveling is achieved.

Figure 8:
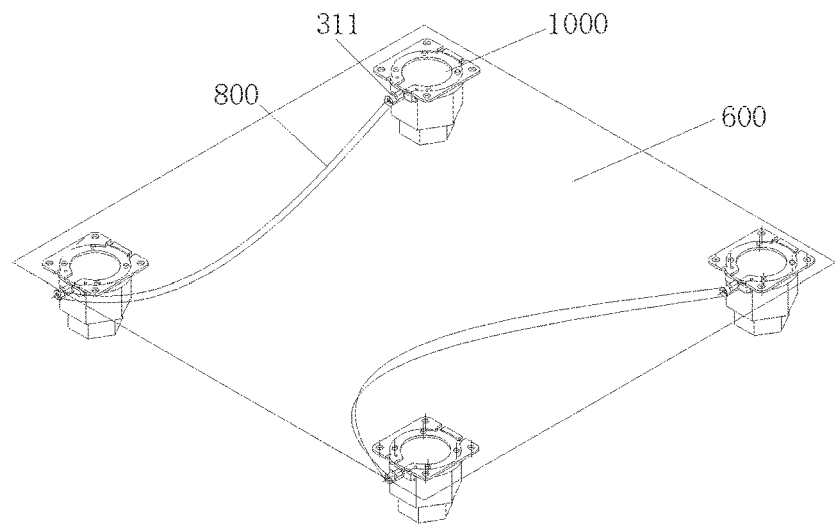
FIG. 8 is a mounting implementation mode II of the support for washing machine with automatic leveling function of the embodiment of the present disclosure.

As shown in FIG. 8, the left side and the right side of the bottom plate 600 for washing machine, provided by the embodiment, are respectively provided with a set of supports for washing machine, and the supports for washing machine 1000 are mounted on four corners of the bottom plate 600. In the embodiment, the uniform stress of a set of supports for washing machine on the left side and the right side for washing machine is effectively achieved, the automatic leveling of height is achieved, and the leveling of the whole washing machine is further achieved.

Figure 9:
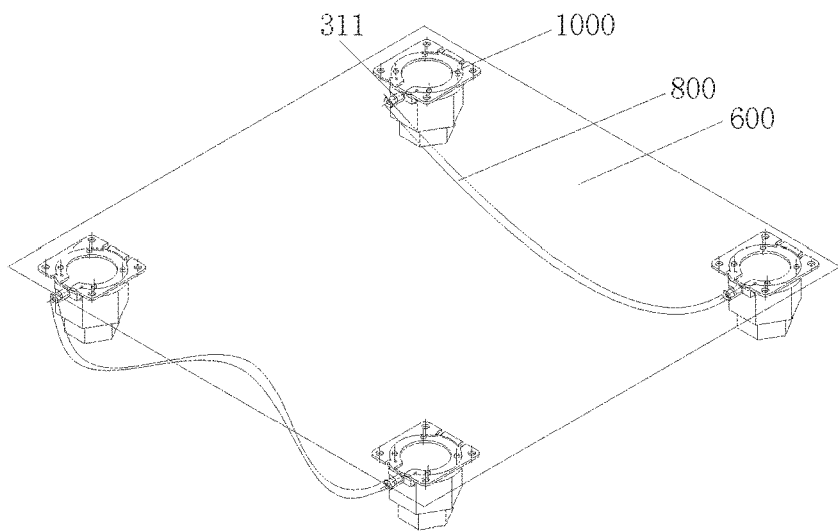
FIG. 9 is a mounting implementation mode III of the support for washing machine with automatic leveling function of the embodiment of the present disclosure.

As shown in FIG. 9, the front side and the rear side of the bottom plate 600 for washing machine, provided by the embodiment, are respectively provided with a set of supports for washing machine, and the supports for washing machine 1000 are mounted on four corners of the bottom plate 600. In the embodiment, the uniform stress of a set of supports for washing machine on the front side and the rear side for washing machine is effectively achieved, the automatic leveling of height is achieved, and the leveling of the whole washing machine is further achieved.

Figure 10:
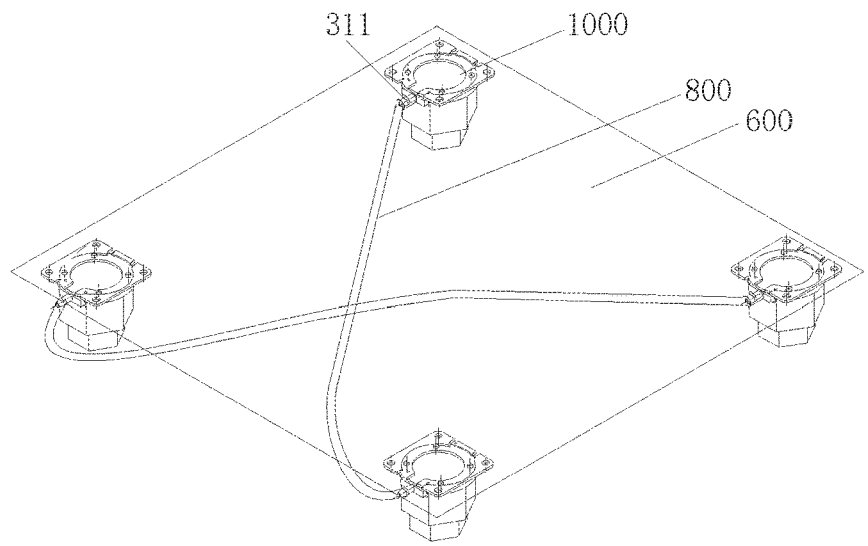
FIG. 10 is a mounting implementation mode IV of the support for washing machine with automatic leveling function of the embodiment of the present disclosure.

As shown in FIG. 10, the two supports 1000 for washing machine on the diagonal line of the bottom plate 600 for washing machine, provided by the embodiment, is communicated by the high pressure oil pipe 800. The uniform stress of the support for washing machine is effectively achieved, the automatic leveling of height is achieved, and the leveling of the whole washing machine is further achieved.

Figure 11:
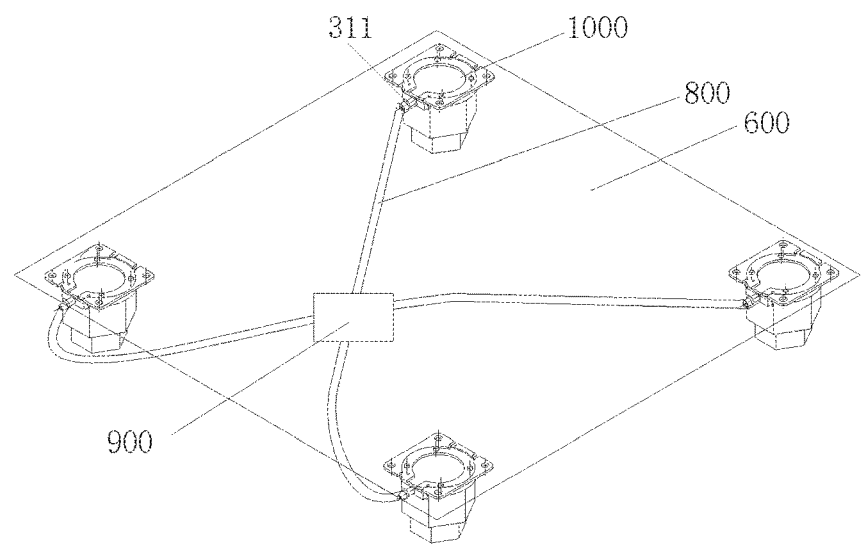
FIG. 11 is a mounting implementation mode V of the support for washing machine with automatic leveling function of the embodiment of the present disclosure.

As shown in FIG. 11, each support 1000 for washing machine on the bottom plate 600 for washing machine, provided by the embodiment, is connected to the same communicating device 900 through the high pressure oil pipe 800. The communication of all supports 1000 for washing machine is realized, the uniform stress of the support for washing machine is effectively achieved, the automatic leveling of height is achieved, and the leveling of the whole washing machine is achieved.

Figure 12:
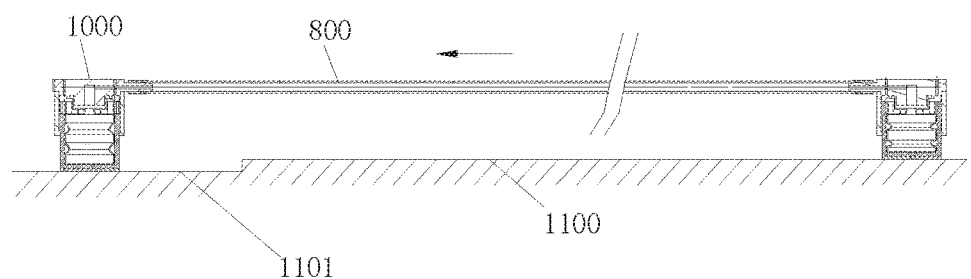
FIG. 12 is a leveling schematic diagram of the support for washing machine with automatic leveling function of the embodiment of the present disclosure.

As shown in FIG. 12, it specifically explains the principle of leveling. After the washing machine is mounted, it results in different height levels of different supports 1000 for washing machine because the ground 1100 is uneven, and the position of the support 1000 for washing machine located at a ground pit 1101 is low. It is possible to know that the support 1000 for washing machine bears the weight for washing machine at first and bears greater gravity. The support 1000 for washing machine in the low position due to failure of the support bears smaller gravity.

The regulating mechanism 400 of the support 1000 for washing machine at a higher position will move upward under a larger pressure, and the height of the whole support will become smaller, so that the volume of the hollow chamber of the oil bag 340 filled with the hydraulic oil is reduced and the hydraulic oil will be forced into the throttling hole and valve hole and flows into the supports at a lower position through the high pressure oil pipe 800. Thus the hydraulic oil of the oil bag 340 of the support at the lower position become more and more, so that the oil bag 340 expends to push the regulating mechanism 400 to elongate.

When the hydraulic pressure of the supports at the high position and the low position are the same, the hydraulic oil no longer flows through the high pressure oil pipe 800. The relative position between the regulating mechanism and the bottom plate of the washing machine no longer changes, and the automatic adjustment of the supports for washing machine is completed.

During the washing or spin-drying process for washing machine, the vibration noise for washing machine is greatly reduced because the hydraulic oil can also slowly flow to self-leveling.

The above-mentioned embodiments are only preferred embodiments of the present disclosure, but not intended to limit the present disclosure in any form. Although the present disclosure has been described in terms of preferred embodiments, it is not intended to be limited to these disclosed embodiments. Equivalent embodiments, of which some changes or modifications are equivalent changes, may be made by any skilled in the art by using the above-mentioned technical contents without departing from the technical scheme scope of the present disclosure. However, all simple amendments, equivalent changes and modifications made to the above embodiments according to the technical essence of the present disclosure without departing from the technical scheme scope of the present disclosure all still fall within the protection scope of the present disclosure.

The invention claimed is:

1. A support for a washing machine with automatic leveling function, comprising
   a sheath;
   a regulating mechanism being arranged inside the sheath in an axial movable manner and a circumferential rotation of the regulating mechanism being limited by the sheath;
   a flexible body assembly being arranged inside the regulating mechanism for accommodating a hydraulic medium, wherein:
   the flexible body assembly comprises a telescopic end which acts on the regulating mechanism, the telescopic end configured to expand and contract under an action of the hydraulic medium and drive the regulating mechanism to move axially for automatic leveling;
   the regulating mechanism is of a columnar structure which is internally provided with a first hollow chamber, an outer surface of a side wall of the columnar structure comprises a plurality of first limiting surfaces;
   the sheath is of the columnar structure which is internally provided with a second hollow chamber, an inner wall of the second hollow chamber of the columnar structure comprises a plurality of second limiting surfaces corresponding to the regulating mechanism; and
   the telescopic end of the flexible body assembly is arranged inside the first hollow chamber of the regulating mechanism, the regulating mechanism is arranged inside the second hollow chamber of the sheath.

2. The support for the washing machine with automatic leveling function according to claim 1, wherein
   the first limiting surfaces and the second limiting surfaces are matched with each other to limit the circumferential rotation of the regulating mechanism in the sheath.

3. The support for the washing machine with automatic leveling function according to claim 1, wherein the regulating mechanism and the sheath are both of a prismatic structure which is internally provided with the hollow chamber.

4. The support for the washing machine with automatic leveling function according to claim 3, wherein
   one end of the flexible body assembly is limited and mounted inside the sheath, another end is the telescopic end which acts on the regulating mechanism,
   the end of the flexible body assembly which is mounted inside the sheath has a limiting surface matched with the regulating mechanism.

5. The support for the washing machine with automatic leveling function according to claim 1, wherein
the second hollow chamber of the sheath penetrates up and down, a stopping part is arranged at an opening of a lower end of the second hollow chamber and extends inwardly;
the outer surface of the side wall of the regulating mechanism is provided with a limiting table, one end of the regulating mechanism penetrates into the second hollow chamber of the sheath from an opening of an upper end, and penetrates out of the second hollow chamber from the opening of the lower end;
the limiting table abuts against the stopping part for preventing the regulating mechanism from falling off from the hollow chamber of the sheath.

6. The support for the washing machine with automatic leveling function according to claim 5, wherein
one end of the flexible body assembly is limited and mounted inside the sheath, another end is the telescopic end which acts on the regulating mechanism,
the end of the flexible body assembly which is mounted inside the sheath has a limiting surface matched with the regulating mechanism.

7. The support for the washing machine with automatic leveling function according to claim 1, wherein
the regulating mechanism comprises a larger end and a smaller end which are integrally formed, a lateral length of the larger end is larger than that of the smaller end, the larger end intersects with the smaller end to form the limiting table;
the outer surface of the side wall of the larger end is matched with the inner wall of the hollow chamber of the sheath, an outer surface of an inner wall of the smaller end is matched with a limiting opening formed by the stopping part.

8. The support for the washing machine with automatic leveling function according to claim 7, wherein
one end of the flexible body assembly is limited and mounted inside the sheath, another end is the telescopic end which acts on the regulating mechanism,
the end of the flexible body assembly which is mounted inside the sheath has a limiting surface matched with the regulating mechanism.

9. The support for the washing machine with automatic leveling function according to claim 1, wherein
one end of the flexible body assembly is limited and mounted inside the sheath, another end is the telescopic end which acts on the regulating mechanism,
the end of the flexible body assembly which is mounted inside the sheath has a limiting surface matched with the regulating mechanism.

10. The support for the washing machine with automatic leveling function according to claim 9, wherein
the flexible body assembly comprises a hydraulic plate, a pressing plate and an oil bag, an opening of the oil bag is hermetically connected to a lower wall of the hydraulic plate through the pressing plate;
one side of the hydraulic plate is provided with an oil nozzle, a lower wall of the hydraulic plate is provided with an oil hole for letting the hydraulic medium inside the oil bag flow in, the hydraulic plate is provided with an oil passage which communicates the oil nozzle and the oil hole;
the hydraulic plate has a limiting surface which is matched with the regulating mechanism; preferably, the hydraulic plate is of a same prismatic structure as the regulating mechanism.

11. The support for the washing machine with automatic leveling function according to claim 10, further comprising a limiting plate, wherein
the limiting plate comprises a limiting claw which is protrudingly arranged, the sheath is provided with a limiting groove which is matched with the limiting claw for limiting;
the limiting plate, the hydraulic plate and the pressing plate are fixedly connected, to limit the circumferential rotation of the flexible body assembly in the regulating mechanism;
the limiting plate is a circular plate-like structure, the sheath further comprises a cylindrical section for accommodating the limiting plate.

12. A washing machine comprising a plurality of supports for a washing machine with automatic leveling function according to claim 1, and a housing, wherein the plurality of the supports for the washing machine are mounted at a bottom of the housing, the hydraulic medium provided inside the support for the washing machine flows inside the support for the washing machine and/or between the supports for the washing machine for leveling.

13. The washing machine according to claim 12, wherein
one end of the flexible body assembly is limited and mounted inside the sheath, another end is the telescopic end which acts on the regulating mechanism,
the end of the flexible body assembly which is mounted inside the sheath has a limiting surface matched with the regulating mechanism.

\* \* \* \* \*